United States Patent [19]
Stringer

[11] 3,837,402
[45] Sept. 24, 1974

[54] PROCESS FOR REMOVING OIL FROM AROUND A WELLBORE
[75] Inventor: Carl Wayne Stringer, Sugarland, Tex.
[73] Assignee: Radon Development Corporation, Houston, Tex.
[22] Filed: Dec. 1, 1972
[21] Appl. No.: 311,131

[52] U.S. Cl............ 166/303, 166/304, 252/8.55 B
[51] Int. Cl...................... E21b 43/22, E21b 43/24
[58] Field of Search........ 166/305 R, 304, 263, 275, 166/302, 303; 252/8.55 B, 8.3

[56] References Cited
UNITED STATES PATENTS

| | | | |
|---|---|---|---|
| 3,452,817 | 7/1969 | Falgatter | 166/305 R |
| 3,470,958 | 10/1969 | Kinney | 166/305 R |

Primary Examiner—Stephen J. NOvosad
Attorney, Agent, or Firm—Pravel, Wilson & Matthews

[57] ABSTRACT

Chemical combination of 1] the reaction of fatty acid with diethanolamine, and 2] ingredient to enhance such reactant's solubility in water, the combination then, on dilution being used to transfer, suspend or remove petroleum or its products.

4 Claims, No Drawings

PROCESS FOR REMOVING OIL FROM AROUND A WELLBORE

BACKGROUND OF THE INVENTION

Heretofore, many different types of surfactants and/or solvents have been used in a myriad of industrial applications. For example in the cleaning or flushing of storage tanks, oil-carrying ship holds, pipelines carrying petroleum products, and the like, solvents have been used to dilute or break down heavy oil build ups. Usually a second flushing occurred using surfactants to further break down the remaining oil particles. While effective, this method is expensive, especially so because of the dual flushing operation, and the heavy concentrations of solvent and surfactant that have heretofore been necessary. Also, in the transferring and storing of crudes in pipelines and tanks, solvents and surfactants were used in heavy concentrations. Some solvents or surfactants break down when exposed to the high temperatures associated with the movement of heavy petroleum products or crudes, such as asphalt. In the areas of cleaning well bores for oil production, water or steam injection and water disposal, solvents, surfactants or acids have oftentimes been used. Acids, while increasing drainage, didn't break down heavy viscous crudes, and sometimes created sludge problems around the well bore. Solvents or surfactants so used, have had to be used in high concentrations. While surfactants have sometimes broken down the viscosity of the crude, they had little if any effect on the formation. Further surfactant problems have involved incompatability between the particular surfactant chosen and the oil or reservoir water encountered, as well as lack of tolerance of the calcium or acid content encountered as well as hear. To these various deficiencies, this inventor is directed.

SUMMARY OF THE INVENTION

The reaction of lauric acid and diethanolamine, together with a dilute coupling agent or solubility enhancer promotes the dispersal or emulsification of oil. This discovery, as well as that such a chemical combination in very small quantitative amounts may be used in a variety of commercial applications constitutes the nature of this invention. Additionally the hazards associated with many common solvents or surfactants, such as flammability or toxicity are eliminated. Further, the invented combination contains no phosphates and is biodegradeable. This chemical combination not only permits the cleaning of the interior of a wide variety of containers, tankers, barges, offshore rigs, truck tanks, used or junk cars or motors, pipelines or other conduits, surfaces and the like, but also may be used as a well bore cleaner and assist in the recovery of oil through drilling and/or injection operations.

DESCRIPTION OF THE INVENTION

Lauric-diethanolamine is manufactured by reacting a fatty acid, lauric, with diethanolamine. The resultant is dispersible in water, and soluble or dispersible in organic solvents. At room temperature it is in a solid state, not basically a wetting agent or detergent, and has been used, in conjunction with detergents as detergent builders, thickeners, foam stabilizers and boosters. It was known that lauric-diethanolamine alone did not readily disperse petroleum or petroleum products. While certain solubility enhancers were previously used to enhance the solubility of lauric-diethanolamine, the ultimate end product was normally of a detergent nature, and primarily as a thickener. This invention concerns a determination that certain enhancers or coupling agents, such as isopropyl alcohol, sodium xylene sulfonate or nonyl phenol, added to the lauric-diethanolamine not only enhances its solubility, but the combination causes encountered petroleum or petroleum products to be dispersed or emulsified in the solution. The discovery of this unique feature permits the accomplishment of the various goals attributed thereto. Especially, the chemical combination may be utilized in very dilute solutions and remain effective. It may be noted that other coupling agents should be satisfactory, so long as they were tolerant of encountered conditions such as calcium, magnesium, salinity, heat or acids.

TESTS

For the purposes of the tests hereinafter described, the following volumetric quantities were used as the invented chemicals sometimes referred to as the I.C.

1/3 Lauric-diethanolamine
1/3 Isopropyl alcohol
1/3 Distilled water The testing concluded there can be some quantitative variance, although the coupling agent has some definite lower limitations, and the coupling agent may be varied, as heretofore mentioned, so long as the particular coupling agents can stand up under the encountered conditions.

LABORATORY TEST PROCEDURE-SALINITY

Tests were conducted using a mixture of 0.6 percent by weight of the I.C., to 99.4 percent by weight of various saline solutions. The first test in each series used fresh tap water. The second test was made using 10,000 ppm saline water, and 18 tests were run in the saline series, increasing the salinity each test by 10,000 ppm until a salinity of 180,000 ppm had been reached. These tests were conducted to test the compatibility of the chemical mixture in varying degrees of salinity. The I.C. showed no trace of precipitation or deterioration of chemical efficiency at 180,000 ppm when the salinity tests were concluded.

LABORATORY TEST PROCEDURE - HYDROCHLORIC ACID

Tests for compatibility with hydrochloric acid were conducted in the same manner as the tests for salinity. Using a 0.6 percent I.C., by weight, in various saline solutions and 30 percent hydrochloric acid, by volume, in each test to establish the compatibility of the invented chemical with hydrochloric acid. The first test in this series was with fresh tap water. The second test was made using 10,000 ppm saline water and 18 tests were run in the saline-hydrochloric acid series increasing the salinity each test by 10,000 ppm until a salinity of 180,000 ppm had been reached. These saline-hydrochloric acid tests were conducted to test the compatibility of the I.C. mixture in varying degrees of salinity with hydrochloric acid. The I.C. mixture showed no trace of precipitation or deterioration of chemical efficiency when used and tested with 180,000 ppm saline and 30 percent hydrochloric acid hydrochloric acid volume.

These saline-hydrochloric acid tests with invented chemical mixture were run to establish the efficiency of the I.C. mixture when used in conjunction with oil well acidizing. Thus the I.C. mixture can be used prior to acidizing, in conjunction with acidizing or after an oil well acidizing treatment and in all cases the invented chemical mixture proved highly successful.

The above tests were further run with actual formation waters and with calcium, magnesium and potassium, in varying degrees. The presence of these chemical elements had no effect on the efficiency of the I.C. mixture. These tests with chemical elements were deemed necessary to check the efficiency of the I.C. mixture with conditions that could be encountered in formations and formation fluids.

OIL DISPERSIBILITY AND EMULSION TESTS

To test the dispersibility, and oil-in-water emulsion qualities of the I.C. mixture, tests were conducted with motor oils, formation fluids and over 15 various crude oils. These dispersibility and oil in water emulsion tests were run extensively and in conjunction with saline and hydrochloric acid mixtures, and formation fluids containing various chemical elements. These tests were conducted to check the efficiency of the invented chemical mixture with various situations and chemical conditions that the invented chemical mixture might encounter in actual working conditions.

FIELD TESTS CONDUCTED

WELL ANNULUS: Cleaning and Sludge Removal

Two types of well annulus cleaning and sludge removal were field tested, these were: 1. Producing well, 2. Water injection well.

Two types of test were conducted on the test wells, they were 1. I.C. mixture with steam and 2. I.C. mixture with water flush.

Tests were conducted on two separate producing oil fields, one was the Grant Oil lease in Nevada, Missouri and the other on the Altoona Field, Chanute, Kansas. Results were as follows:

Test number 1 was on a producing well on the Grant Oil Lease, Nevada, Missouri. The field produces asphaltic based crude. The average well depth is 290 feet. The formation is a mixture of sand and shale. The API gravity of the oil in the test well was 15.7, and the centistokes were 1,900 at 72°F.

A mixture of I.C. with formation water at a ratio of six (6) gallons I.C. to one thousand (1,000) gallons formation water was used. A total of 100 bbls treated fluid was injected into the annulus and oil bearing formation at a rate of 0.5 bbls per minute until the 100 bbls treated fluid had been injected. The pressure at initial injection was 575 p.s.i., after 25 bbls treated fluid had been injected the pressure dropped to 325 p.s.i. and this pressure was maintained throughout the remaining fluid injection.

The well was immediately back flowed. The returning fluid was approximately 20–25 percent oil dispersed or emulsified in the water.

A second test was conducted on this producing well approximatley 4½ weeks later. In this test the I.C. was used in conjunction with steam injection. The I.C. for this test was mixed at the same ratio as for the chemical-water flush test, however, for the steam test only 25 bbls chemically treated water was used. This chemically treated water was injected into the annulus and formation at 0.5 bbls per hour. The pressure at injection was approximately 375 p.s.i. After injecting chemically treated fluid into the annulus, this was followed by steam at 417°F and 300 p.s.i. for approximately 45 minutes. The well was again back flowed and the returning fluid had an oil ratio of 30–45 percent dispersed or emulsified oil in returning water. Conclusions, Test Number 1, Producing Oil Well:

The chemical water flush proved that in testing under field conditions the I.C. mixture was as successful in the field as those test conducted under laboratory conditions. The ability of the I.C. to disperse or emulsify heavy viscous crudes such as the test well at 15.7 A.P.I. gravity and change the viscosity to 1–2 centipoise, and the ability of the I.C. to be stable enough to hold the oil in suspension until the annulus fluid can be produced proves the laboratories conclusion to be correct.

The chemical and cyclic steam test proved again that in testing under field conditions the I.C. was as successful in the field as those test conducted under laboratory conditions. The extreme temperature of the steam injection did not effect the efficiency of the I.C. mixture and seemed to act as an aid in further breaking down the viscosity of the heavy viscous crude. The I.C. mixture, when used in conjunction with steam is effective as an annulus and formation cleaner even when used in small amounts.

Test number 2 was conducted on water injection wells, on the Altoona Field, Chanute, Kansas. Tests were conducted on four separate wells. This field produces a light crude, approximately 32° A.P.I. gravity. The oil bearing formation is about 600 feet. The pump pressure for the Altoona Field injection pump was 600 p.s.i. Well number 1 was at 300 p.s.i., well number 2 at 275 p.s.i., well number 3 at 180 p.s.i. and well number 4 at 225 p.s.i. The tests on all four water injection wells in the Altoona Field were conducted in the same manner. The wells were shut in and in this test a concentration of 1,000 milliliters of the I.C. mixture was poured directly into the injection tubing of each well. The wells were then reconnected to the injection pump at 600 p.s.i. Calculations were made as to the time the I.C. mixture should be displaced to the face of the formation. These calculations were not necessary as the pressure gauges reflected the drop in injection pressures when the invented chemical reached the face of the formation. The p.s.i. reading on each individual well reflected the drop in pressure as follows: Well number 1 dropped to 250 p.s.i., well number 2 dropped to 185 p.s.i., well number 3 dropped to 160 p.s.i. and well number 4 dropped to 175 p.s.i. Conclusions, Test Number 2, Water Injection Wells:

This test with the concentrated I.C. mixture followed by water at injection pressures normal for this field proved that the I.C. mixture is capable of removing and dispersing any hydrocarbon film or buildup on the well annulus and injection formation. The I.C. mixture was capable of moving the oil film or buildup out into the formation and allowed the water injection rates to be increased at lower pressures.

Although limited chemical combinations and methods have been described, it should be obvious that numerous modifications would be possible by one skilled in the art without departing from the spirit of the invention, the scope of which is limited only by the following claims:

I claim:
1. A new process for removing oil from in and around a well bore comprising the steps of
   a. inserting within the well bore an aqueous mixture of lauric-diethanolamine and a coupling agent selected from the group consisting of isopropyl alcohol, sodium xylene sulfonate and nonyl phenol, thereby causing said oil to be suspended or emulsified in said mixture; and
   b. causing said suspended or emulsified oil to be removed from said well bore.

2. The process of claim 1 wherein said mixture is inserted into said well bore along with water, said water having a ratio to said mixture of upwards of 95 to 1.

3. The process of claim 1 wherein steam is injected within said well bore following said insertion of said aqueous mixture.

4. The process of claim 1 wherein said aqueous mixture is comprised of equal volumetric quantities of said lauric-diethanolamine, isopropyl alcohol and water.

* * * * *